(12) United States Patent
May et al.

(10) Patent No.: US 12,579,192 B2
(45) Date of Patent: Mar. 17, 2026

(54) PROMISE KEYS FOR RESULT CACHES OF DATABASE SYSTEMS

(71) Applicant: SAP SE, Walldorf (DE)

(72) Inventors: Norman May, Karlsruhe (DE); Dan Ding, Xi'an (CN); Zhe Qu, Xi'an (CN); Fei Qiu, Xi'an (CN)

(73) Assignee: SAP SE, Walldorf (DE)

( * ) Notice: Subject to any disclaimer, the term of this patent is extended or adjusted under 35 U.S.C. 154(b) by 293 days.

(21) Appl. No.: 18/343,938

(22) Filed: Jun. 29, 2023

(65) Prior Publication Data

US 2025/0005078 A1      Jan. 2, 2025

(51) Int. Cl.
*G06F 16/00* (2019.01)
*G06F 16/903* (2019.01)

(52) U.S. Cl.
CPC .............................. *G06F 16/90335* (2019.01)

(58) Field of Classification Search
CPC ................................................ G06F 16/90335
USPC ........................................................ 707/722
See application file for complete search history.

(56) References Cited

U.S. PATENT DOCUMENTS

| | | | | | |
|---|---|---|---|---|---|
| 5,960,194 | A * | 9/1999 | Choy | .................... | G06F 16/278 |
| | | | | | 707/999.102 |
| 7,356,549 | B1 * | 4/2008 | Bruso | ................. | G06F 16/2246 |
| | | | | | 707/972 |
| 10,860,668 | B1 * | 12/2020 | Zhang | ................. | G06F 16/9535 |
| 11,119,997 | B2 * | 9/2021 | Gurajada | ............ | G06F 11/1474 |
| 11,853,806 | B2 * | 12/2023 | Williams | .............. | H04L 67/568 |
| 2002/0178341 | A1 * | 11/2002 | Frank | .................. | G06F 12/0866 |
| | | | | | 711/216 |
| 2006/0095439 | A1 * | 5/2006 | Buchmann | ............. | G06Q 10/10 |
| 2016/0092265 | A1 * | 3/2016 | Kogan | .................. | G06F 9/4843 |
| | | | | | 718/102 |
| 2017/0132357 | A1 * | 5/2017 | Brewerton | ............. | G16B 50/00 |
| 2017/0329578 | A1 * | 11/2017 | Iscen | ......................... | G06F 8/31 |
| 2018/0232259 | A1 * | 8/2018 | Chowdhury | .......... | G06F 9/4881 |
| 2019/0108139 | A1 * | 4/2019 | Wong | .................. | G06F 12/1408 |
| 2019/0268308 | A1 * | 8/2019 | Sinha | ...................... | G06F 21/64 |
| 2019/0305950 | A1 * | 10/2019 | Treat | ...................... | H04L 9/3239 |
| 2019/0317938 | A1 * | 10/2019 | Agarwalla | .......... | G06F 16/2458 |
| 2019/0347387 | A1 * | 11/2019 | Woodward | ............. | G16H 15/00 |
| 2020/0014688 | A1 * | 1/2020 | Kohli | ..................... | H04L 9/0891 |
| 2020/0125078 | A1 * | 4/2020 | Koudal | ........... | G05B 19/41865 |
| 2020/0133836 | A1 * | 4/2020 | Mizushima | ........... | G06F 3/0652 |
| 2020/0134615 | A1 * | 4/2020 | Wu | ......................... | G06Q 20/42 |
| 2021/0096926 | A1 * | 4/2021 | Williams | ................ | H04L 67/34 |
| 2021/0397402 | A1 * | 12/2021 | Ashkenazi | ............ | H04L 63/105 |

(Continued)

*Primary Examiner* — Ann J Lo
*Assistant Examiner* — Rezwanul Mahmood
(74) *Attorney, Agent, or Firm* — Fish & Richardson P.C.

(57) ABSTRACT

Methods, systems, and computer-readable storage media for receiving, from a database client, an asynchronous lookup request including a key representative of a query and, in response, returning a value handle including a value promise, receiving, from the database client, a get request based on the value promise, determining that a query result corresponding to the key is unavailable in a results cache and that the key is in an unlocked state, and in response, returning a null pointer and a first key lock status to the first database client, receiving, from the database client, a key, value pair including the key and a value, the value comprising the query result, and storing the key, value pair in the results cache.

20 Claims, 5 Drawing Sheets

(56) References Cited

U.S. PATENT DOCUMENTS

| | | | |
|---|---|---|---|
| 2022/0075782 A1* | 3/2022 | Hines | G06F 16/211 |
| 2022/0075825 A1* | 3/2022 | Helms | H04L 9/3234 |
| 2022/0078149 A1* | 3/2022 | Hines | G06F 3/04842 |
| 2022/0078797 A1* | 3/2022 | Helms | G06F 3/02 |
| 2023/0297706 A1* | 9/2023 | Aslani | H04L 63/1416 |
| | | | 726/27 |
| 2025/0005078 A1* | 1/2025 | May | G06F 16/24539 |
| 2025/0139070 A1* | 5/2025 | Chen | G06F 16/2358 |
| 2025/0190614 A1* | 6/2025 | Lahav | H04L 9/0894 |

* cited by examiner

PROMISE KEYS FOR RESULT CACHES OF DATABASE SYSTEMS

BACKGROUND

Database systems store data in tables based on data models and enable queries to be executed to provide query results that can include, for example, one or more views on the data stored in the tables. In some instances, the data models and queries can implicate hundreds of database tables and provide relatively large query results over upwards of millions and even billions of records. In some instances, queries resulting in such relatively large query results can be executed at relatively high frequencies, which produces large workloads for the database system.

In order to reduce workloads and avoid time- and resource-expensive query re-execution, some database systems employ result caching. For example, for each query, the query result generated by the database system can be stored in a result cache. In this manner, if a query is received, the query can be checked against the result cache to determine whether the query result corresponding to the query is stored in the result cache. If the query result is stored in the result cache, the query result can be returned from the result cache, which avoids resource-expensive query execution and computation of the query results. If the query result is not available in the result cache, the query is executed and the query result is computed, which consumes resources (e.g., memory, processors).

However, it can occur that the same query can be contemporaneously submitted to a database system from multiple database clients (e.g., applications), which can result in redundant query executions and computations of the query result. For example, a query that is contemporaneously submitted by multiple database clients can result in redundant query executions and query result computations, because the query result that is being computed is not yet stored in the result cache at the times later queries are checked against the result cache.

SUMMARY

Implementations of the present disclosure are directed to result caches in database systems. More particularly, implementations of the present disclosure are directed to use of promise keys for query result requests to result caches for resource-efficient use of database systems.

In some implementations, actions include receiving, from a database client, an asynchronous lookup request including a key representative of a query and, in response, returning a value handle including a value promise, receiving, from the database client, a get request based on the value promise, determining that a query result corresponding to the key is unavailable in a results cache and that the key is in an unlocked state, and in response, returning a null pointer and a first key lock status to the first database client, receiving, from the database client, a key, value pair including the key and a value, the value comprising the query result, and storing the key, value pair in the results cache. Other implementations of this aspect include corresponding systems, apparatus, and computer programs, configured to perform the actions of the methods, encoded on computer storage devices.

These and other implementations can each optionally include one or more of the following features: actions further include transitioning a state of the key from the unlocked state to a locked state before receiving, from the first database client, a key, value pair; the first database client initiates query execution and query result computation in response to the null pointer and a key lock status; actions further include receiving, from a second database client and prior to storing the key, value pair in the results cache, a second asynchronous lookup request including the key representative of the query and, in response, returning the value handle comprising the value promise, receiving, from the second database client, a second get request based on the value promise, and determining that the query result corresponding to the key is unavailable in a results cache and that the key is in a locked state, and in response, returning the null pointer and a second key lock status to the second database client; actions further include receiving, from the second database client and after to storing the key, value pair in the results cache, a third get request based on the value promise, and determining that the query result corresponding to the key is available in a results cache, and in response, returning the query result to the second database client; the key is generated by processing the query through a hash function; and the value handle is a wrapper that holds data and executes one or more functions.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
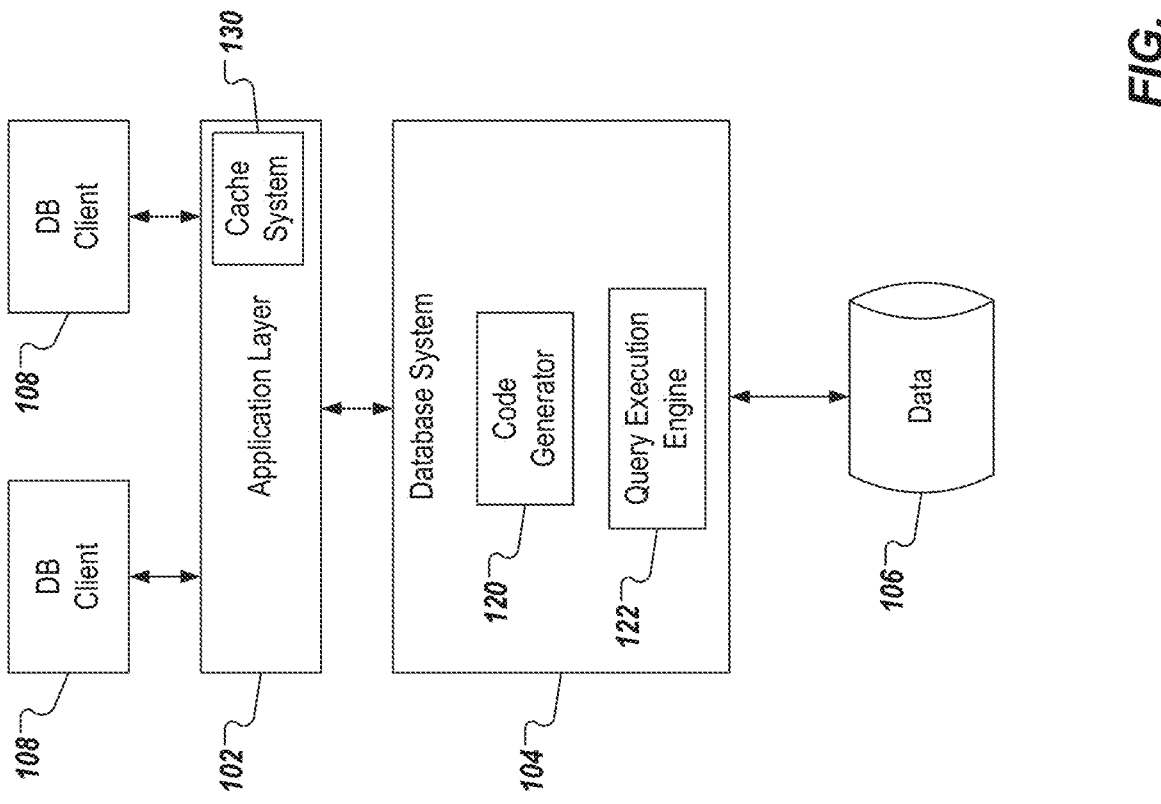
FIG. 1 depicts an example architecture that can be used to execute implementations of the present disclosure.

Implementations of the present disclosure are directed to result caches in database systems. More particularly, implementations of the present disclosure are directed to use of promise keys for query result requests to result caches for resource-efficient use of database systems. Implementations can include actions of receiving, from a database client, an asynchronous lookup request including a key representative of a query and, in response, returning a value handle including a value promise, receiving, from the database client, a get request based on the value promise, determining that a query result corresponding to the key is unavailable in a results cache and that the key is in an unlocked state, and in response, returning a null pointer and a first key lock status to the first database client, receiving, from the database client, a key, value pair including the key and a value, the value comprising the query result, and storing the key, value pair in the results cache.

To provide further context for implementations of the present disclosure, and as introduced above, database systems store data in tables and enable queries to be executed to provide query results that can include, for example, one or more views on the data stored in the tables. Some database systems, such as in-memory database systems, can include relatively complex data objects, such as data cubes (e.g., an online analytical processing (OLAP) data cube). In some examples, a data cube is provided as an array of data categorized into one or more dimensions. For example, a data cube can be a representation of a multi-dimensional spreadsheet (e.g., a multi-dimensional dataset including a plurality of data tables). In some examples, a data cube includes a plurality of cells, where cells are populated with respective values (e.g., number, text). In some examples, each value represents some measure (e.g., sales, revenue, profits, expenses, budget, forecast).

In some examples, a data cube can enable manipulation and/or analysis of data stored in the data cube from multiple perspectives (e.g., by dimensions, measures, and/or elements of the data cube). In some examples, a dimension of a data cube defines a category of stored data. Example dimensions can include, without limitation, time, location, product. In some examples, each dimension can have one or more sub-dimensions. In some examples, a data cube can include three-dimensions. In some examples, a data cube having more than three-dimensions is referred to as a hypercube. Data stored in the data cube includes one or more measures. In some examples, each measure is a fact (e.g., a numerical fact, a textual fact). In some examples, each measure can be categorized into one or more dimensions.

Queries can be executed on data stored in database systems to provide query results. Example queries be written as multidimensional expressions (MDX) that can be described as a query language for OLAP. Among other operations, queries can join, project, and aggregate data stored in tables using relational operators to provide query results. In some instances, the data models and queries can implicate hundreds, if not thousands of database tables and provide relatively large query results over upwards of millions and even billions of records. In some instances, queries resulting in such relatively large query results can be executed at relatively high frequencies, which produces large workloads for the database system.

In further detail, query execution can include parsing using a parser, optimizing using an optimizer, and executing using an execution engine, each of which can be provided as one or more computer-executable programs. In some instances, the parser includes a syntax checker and a semantics checker. The parser parses the query to define a data structure that enables further processing. In some examples, the data structure includes an abstract syntax tree (AST), which can be described as a tree representation of the abstract syntactic structure of the query written in a query language (e.g., MDX). The AST includes nodes, each node representing a query statement. The syntax checker processes the query to ensure that the query is syntactically correct (e.g., conforms to rules for syntactically correct queries). The semantics checker processes the query to ensure that the query is semantically correct. The semantics check can generally be described as determining whether a query statement is meaningful in terms of what is being requested from the database system. That is, for example, whether the data objects (e.g., tables, columns, views, procedures) in the statement actually exist within the database system. In some examples, the semantics checker also performs an authorization check to determine whether the entity (e.g., user) that submitted the query is authorized to access the data that would be returned by the query.

If the syntax check, the semantics check, and the authorization check are all passed (i.e., there is no syntax error, there is no semantics error, there is no authorization error), the AST of the query is provided to the optimizer, which provides a query execution plan (QEP). In some examples, the QEP is a list of programmatic instructions that are to be executed to provide the query result. In some examples, the QEP includes a number of operations, which can include, for example and without limitation, read and write operations. In general, the QEP defines the sequence in which tables are accessed, methods used to extract data from each table, and methods for computing calculations, filtering, aggregating, and/or sorting data from each table. In some examples, multiple QEPs could be executed to provide the query result. However, the optimizer outputs the QEP that is determined to be optimal (e.g., in terms of computing resources and memory expended to execute the QEP) among the multiple QEPs. For example, the optimizer can include a query rewriter to rewrite the QEP to provide the multiple QEPs, and resource consumption and/or time to execute can be evaluated for each QEP. The execution engine executes the QEP provided by the optimizer to provide the query result.

Accordingly, time and resources are consumed in getting to the point where the query (as the QEP) is executed on data in the underlying database. Execution of the query (as the QEP) on the underlying database also consumes time and resources. Further, data that is responsive to the query is returned and computations on the data can be executed, further consuming time and resources.

In order to reduce workloads and avoid time- and resource-expensive query re-execution and query result computation, some database systems employ result caching. For example, for each query, the query result generated by the database system can be stored in a result cache. In this manner, if a query is received, the query can be checked against the result cache to determine whether the query result corresponding to the query is stored in the result cache. If the query result is stored in the result cache, the query result can be returned from the result cache, which avoids resource-expensive query execution and computation of the query results. If the query result is not available in the result cache, the query is executed and the query result is computed, which consumes resources (e.g., memory, processors, network bandwidth).

In some instances, a query (the same query) can be contemporaneously submitted to a database system from multiple database clients (e.g., applications), which can result in redundant query executions and computations of the query result. For example, a first database client can submit a query and it can be determined that a query result for the query is not cached. As a result, the query is executed, the query result is computed, and the query result is subsequently cached. However, it can occur (and frequently does occur) that a second database client submits the same query, while the query is being executed and the query result is being computed in response to the query being submitted by the first database client. Because the query is still absent from the result cache while the query is being executed and the query result is being computed, the query will again be executed for the second database client, and the query result again be computed. In short, a query that is contemporaneously submitted by multiple database clients can result in redundant query executions and query result computations. This is both time- and resource-inefficient.

In view of the above context, implementations of the present disclosure provide a cache system that uses promise keys for query result requests to result caches for resource-efficient use of database systems. As described in further detail herein, the cache system of the present disclosure mitigates redundant query execution and query result computation in scenarios where a query is contemporaneously submitted by multiple database clients. As used herein, contemporaneous can mean that there is an overlap in time between receipt of the same query from multiple database clients and determining the query result to return to at least one of the database clients.

Implementations of the present disclosure are described in further detail herein with reference to OLAP, data cubes, and MDX queries. It is contemplated, however, that implementations of the present disclosure can be realized with any appropriate processing, data objects, and/or query languages (e.g., structured query language (SQL)).

FIG. 1 depicts an example architecture 100 in accordance with implementations of the present disclosure. In the depicted example, the example architecture 100 includes an application layer 102, a database system 104 that manages a database 106 (e.g., stored in a non-transitory computer readable storage medium), and multiple database (DB) clients 108. Although, in the example of FIG. 1, the database 106 is depicted separately from the database system 104, it is contemplated that the database 106 can be included within the database system 104. The database system 104 can include any suitable database system. An example database system includes, without limitation, SAP HANA provided SAP SE of Walldorf, Germany. The database system 104 can be programmed to manage data stored in the database 106. For example, the database system 104 can be programmed to load data to the database 106 and/or to execute one or more queries of the database 106. The database system 104 can be executed using any suitable computing device(s), such as, for example, one or more servers.

In some examples, the database clients 108 can each submit queries to and receive queries from the database system 104 through the applications layer 102. For example, a query can be provided to the database system 104, which processes the query to provide query results that can include, for example, one or more views on data stored in the database 106. The queries can include one or more expressions (e.g., a nested set of expressions) and can be expressed in any appropriate query language (e.g., MDX, SQL). In some examples, one or more of the queries can be automatically generated by the database clients 108 (or the application layer 102). In some examples, one or more of the queries are generated by a human user, for example, using the database client 108. The database management system 102 may receive a query and execute the query, as described herein. In some examples, a code generator 120 generates optimized query code that optimizes one or more expressions of the query. The optimized query code is executed by a query execution engine 122 to generate a query result, which is returned to the database client 108 that had submitted the query. In some examples, generation of the query result can include receiving data that is responsive to the query from the database 106 and executing one or more computations over the data (e.g., aggregations, statistics).

Although not depicted in the example of FIG. 1, the database system 104 can include multiple layers. Example layers include a calculation engine layer, a logical layer, and a physical table-pool (e.g., in the database 106). Calculation scenarios can be executed by a calculation engine in the calculation engine layer. The calculation engine layer can be based on and/or interact with the logical layer and the physical table pool. The physical table pool can include tables containing the data. Various tables can be joined using logical metamodels defined by the logical layer to form a new index. For example, the tables in a cube (OLAP view) can be assigned roles (e.g., fact or dimension tables) and joined to form a star schema, for example. It is also possible to form join indexes, which can act like database views in environments such as the Fast Search Infrastructure (FSI) provided by SAP AG. In some examples, calculation scenarios can include individual calculation nodes that each define operations such as joining various physical or logical indexes and other calculation nodes. For example, the input for a calculation node can be one or more physical, join, or OLAP views or calculation nodes. Processing of data along a tree of calculation nodes ultimately provides a query result to a query.

Referring again to FIG. 1, and as described in further detail herein, a cache system 130 is provided that enables query results to be stored in a cache for later reuse. Such reuse improves performance by reducing the processing burden incurred by having to re-executing a previously executed query, requesting data responsive to the query from the database 106, and re-computing the query result. Although, in the example of FIG. 1, the cache system 130 is provided at the application layer 102, it is contemplated that the cache system 130 can be provided within the database system 104.

Figure 2A:
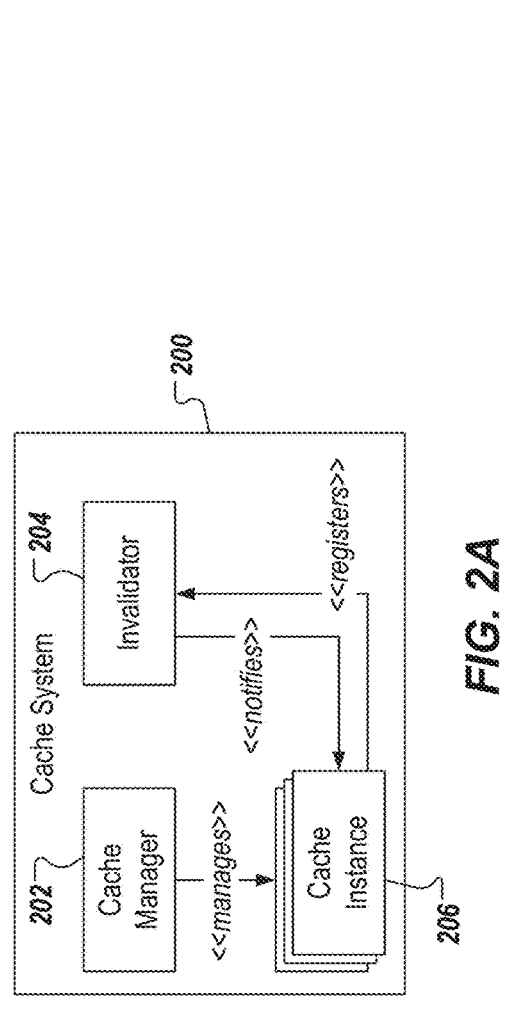
FIGS. 2A and 2B depict example cache systems in accordance with implementations of the present disclosure.

FIG. 2A depicts an example cache system 200 (e.g., the cache system 130 of FIG. 1). In the example of FIG. 2A, the cache system 200 includes a cache manager 202, an invalidator 204, and one or more cache instances 206, each cache instance 206 being a result cache in the context of the present disclosure. For example, if a query result to a query is not available in a cache instance 206, the query is executed and the query result is generated. The query result is stored in the cache instance 206 as a key (k) value (v) pair (k, v). In some examples, the key represents the query and the value represents the query result. In some examples, the key is provided as a hash value that is generated by processing the query through a hash function. For example, the query can be processed through a deterministic hash function to provide the key as a hash value. In some examples, the value (query result) is provided as-is (e.g., no hashing).

In some examples, cache entries of each cache instance 206 are registered with the invalidator 204, which notifies each cache instance 206 of any changes to a cache as managed by the cache manager 202. In some examples, management of the cache instances 206 by the cache manager 202 includes collecting cache usage statistics and distributing available memory across the cache instances 206. As noted above, cache entries include key, value pairs and can be of any appropriate user-defined type. The cache instances 206 implement various interfaces including, for example, insertion, lookup, check, and invalidation with a configurable set of cache replacement policies (e.g., least recently used (LRU)).

In some examples, in response to a change to a dependent data object, the invalidator 204 notifies the cache instances 206 about the changes. For example, a change can include a change to data stored in one or more tables. These notifications are dispatched from the invalidator 204 based on the registered dependencies. For invalidation, cache entries can be marked as invalid. For example, a query result is provided based on data and the query result is cached, and, if there is a change to that data, the query result is no longer valid. Consequently, the query result as cached in the cache instances 206 can be removed.

Figure 2B:
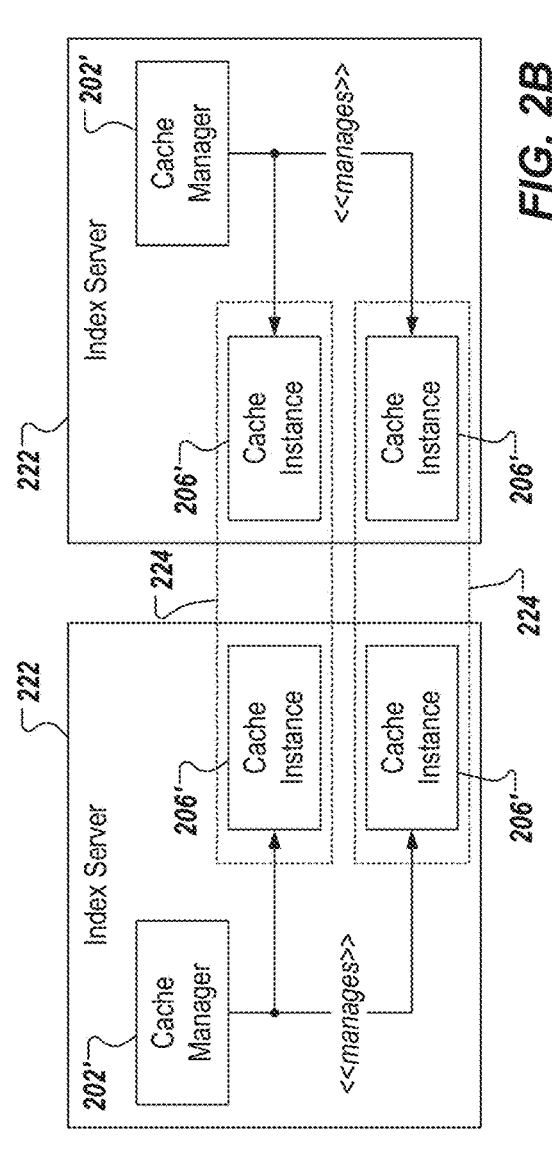
Figure 2B:

FIG. 2B depicts an example cache system 220 in a distributed server landscape 200 across a number of index servers 222. The index servers 222 each include a cache manager 202' to support a number of logical caches 224. Each logical cache 224 is supported by the distributed, multiple index servers 222, which provide a number of distributed cache instances 206'. Each cache instance 206' represents the same cache instance to each respective index server 222. The logical caches 224 are respectively identified by a unique identifier. The cache manager 202' handles communication in a distributed landscape of index servers 222.

As introduced above, implementations of the present disclosure provide a cache system (e.g., the cache system 130 of FIG. 1, the cache systems 200, 220 of FIGS. 2A and 2B, respectively) that uses promise keys for query result requests to result caches for resource-efficient use of database systems. More particularly, in response to a query result request from a database client, the cache system provides a promise key (ValuePromise (vp)) and a background asynchronous lookup-job is created. In some examples, the promise key is a key generated by a respective cache instance of its own type. A value handle, which includes the promise key, is returned to the database client. In some examples, the value handle can be described as an object that wraps data (e.g., the value promise) and provides one or more functions. Example functions can include checking locking of a query result and tolling of a time period to re-request the query result. For example, the value handle can execute functionality to value handle request the cached value, which is returned in response, if the value is cached and valid.

In accordance with implementations of the present disclosure, and as described in further detail herein, subsequent parallel requests for a query result that is being added to the result cache can be held. In this manner, the database clients that submitted the parallel requests do not execute the query and compute the query results in response to an indication that the query result is absent from the result cache. That is, the cache system of the present disclosure avoids redundant query execution and query result computation, while query execution and query result computation are pending from a previous request. This enables the database clients that submitted the parallel requests to use resources to perform other tasks, while waiting for the query result to be available in the result cache.

Figure 3:
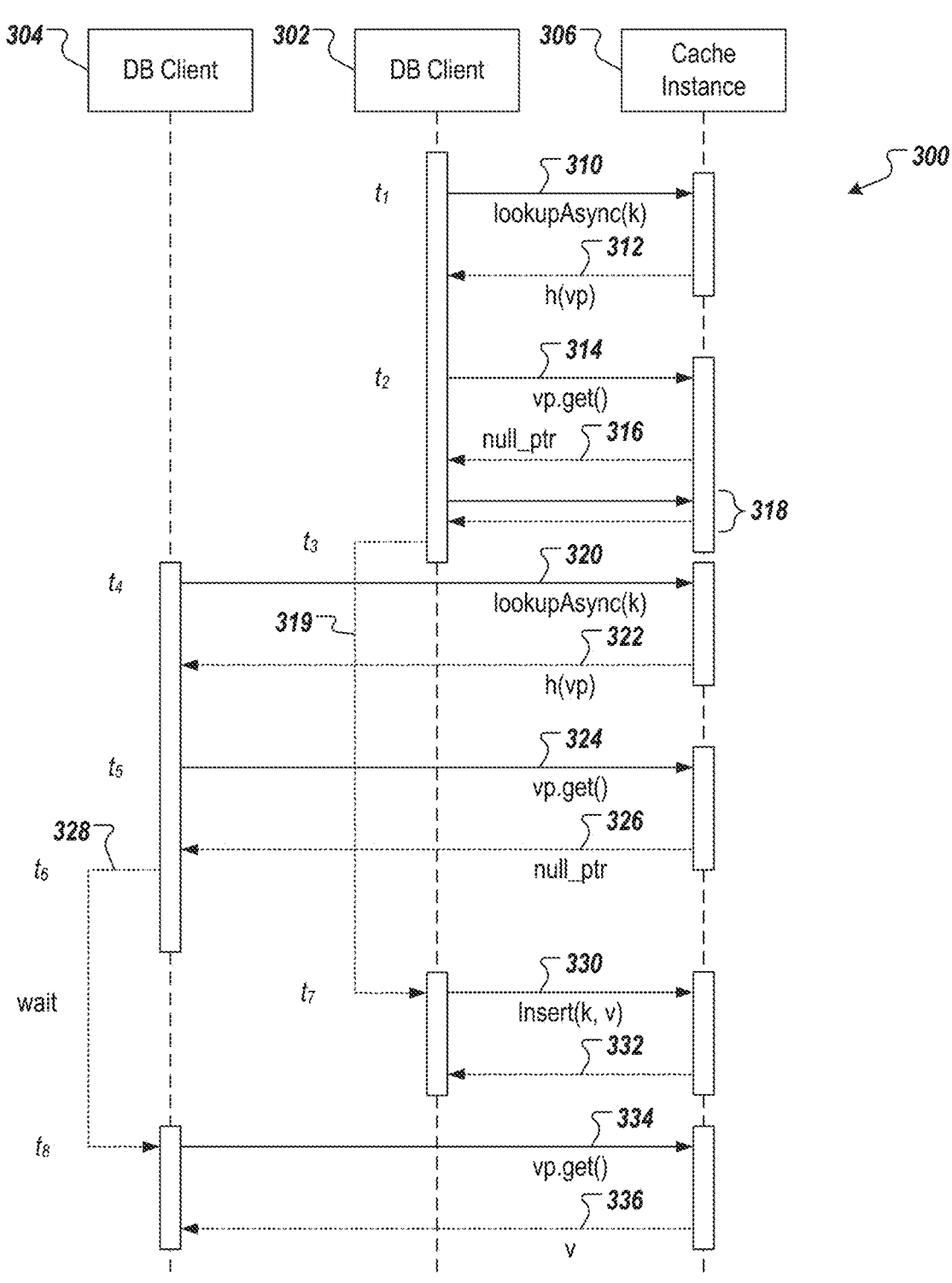
FIG. 3 depicts an example signal flow diagram in accordance with implementations of the present disclosure.

FIG. 3 depicts an example signal flow diagram 300 in accordance with implementations of the present disclosure. The example flow diagram 300 depicts interactions between each of a database client 302 and a database client 304 and a cache instance 306.

In the example of FIG. 3, the database client 302 executes an asynchronous lookup (310) for a query result based on a key (k). This is done at time $t_1$. For example, the database client 302 can seek to query a database using a query (Q). Before expending resources to execute the query and compute a query result, the database client 302 computes k (e.g., by processing the query (Q) through a hash function) and executes the asynchronous lookup to the cache instance 306 at time $t_1$. In response, the cache instance 306 returns (312) a value handle (h) with a value promise (vp). At time $t_2$, the database client 302 executes (314) a get function based on the value promise (vp.get( ) to request the query result (value) from the cache instance 306.

In the example of FIG. 3, at time $t_2$, the query result is absent from the cache and the key (k) is not locked within the cache instance 306. In response, to the get function, the cache instance 306 returns (316) a null pointer (indicating that the query result is not cached) and a lock status indicating that the key (k) is not locked. In response, the database client 302 interacts with the cache instance 306 to lock the key (k) within the cache (e.g., add the key (k) to the cache and put the key(k) in a locked state) and, at time $t_3$, initiates query execution and query result computation (319), as described in detail herein.

In the example of FIG. 3, at time $t_4$, the database client 304 executes an asynchronous lookup (320) for a query result based on a key (k). For example, the database client 304 can seek to query the database using the query (Q), which is the same query that the database client 302 sought to query the database. Before expending resources to execute the query and compute a query result, the database client 304 computes k (e.g., by processing the query (Q) through a hash function) and executes the asynchronous lookup to the cache instance 306 at time $t_4$. In response, the cache instance 306 returns (322) a value handle (h) with a value promise (vp). At time $t_5$, the database client 304 executes (324) a get function based on the value promise (vp.get( )) to request the query result (value) from the cache instance 306.

In the example of FIG. 3, at time $t_5$, the query result is absent from the cache, but the key (k) is locked within the cache instance 306. In response, to the get function, the cache instance 306 returns (326) a null pointer (indicating that the query result is not cached). In response, the database client 304 starts (328) a waiting period at time to. In some examples, tolling of the waiting period is a function provided by the value handle. In this manner, the database client 304 refrains from initiating its own query execution and query result computation and can use resources that would have been otherwise expended for those tasks on other tasks, while it waits for the query result to be available in the cache. In some examples, the value handle provides a timeout function, such that, if the value is not returned before expiration of a timeout period, the database client 304 will execute the query and computer the query results.

In the example of FIG. 3, at time $t_7$, query execution and query result computation are complete, and the database client 302 has the query result. The database client 302 executes an insert function (insert(k, value)) to insert the key(k) and value (v) pair into the cache within the cache instance 306. Here, the value is the query result. In response, the cache instance 306 confirms (332) storage of the key and value pair in the cache and releases the lock on the key. In the example of FIG. 3, at time to, the waiting period has tolled and the database client 304 again executes (334) the get function based on the promise key (vp.get( ) to request the query result (value) from the cache instance 306. In response, the cache instance 306 returns (336) the value (v).

As represented in FIG. 3, the query result request of the database client 304 is contemporaneous as that of the database client 304. For example, the query result request of the database client is received at time $t_4$, which is between times $t_1$ and $t_7$. As also represented in FIG. 3, the database client 304 does not execute the query or compute the query result in response to the query result being absent from the cache at time $t_5$. Instead, and in accordance with implementations of the present disclosure, the (later-requesting) database client 304 waits for the query result to be cached from the (earlier-requesting) database client 302. In this manner, computational resources are conserved by avoiding both of the database clients 302, 304 executing the query and computing the query result. Further, time is conserved for at least the database client 304. For example, the timespan from $t_4$ to $t_8$ is less than the timespan from $t_1$ to $t_7$. That is, by waiting for the query result to be provided from the database client 302, the query result is received more quickly by the database client 304 than if the database client 304 had done its own query execution and query result computation. Further time is conserved by the database client 304 being able to execute other tasks during the waiting period ($t_6$ to $t_8$).

Figure 4:
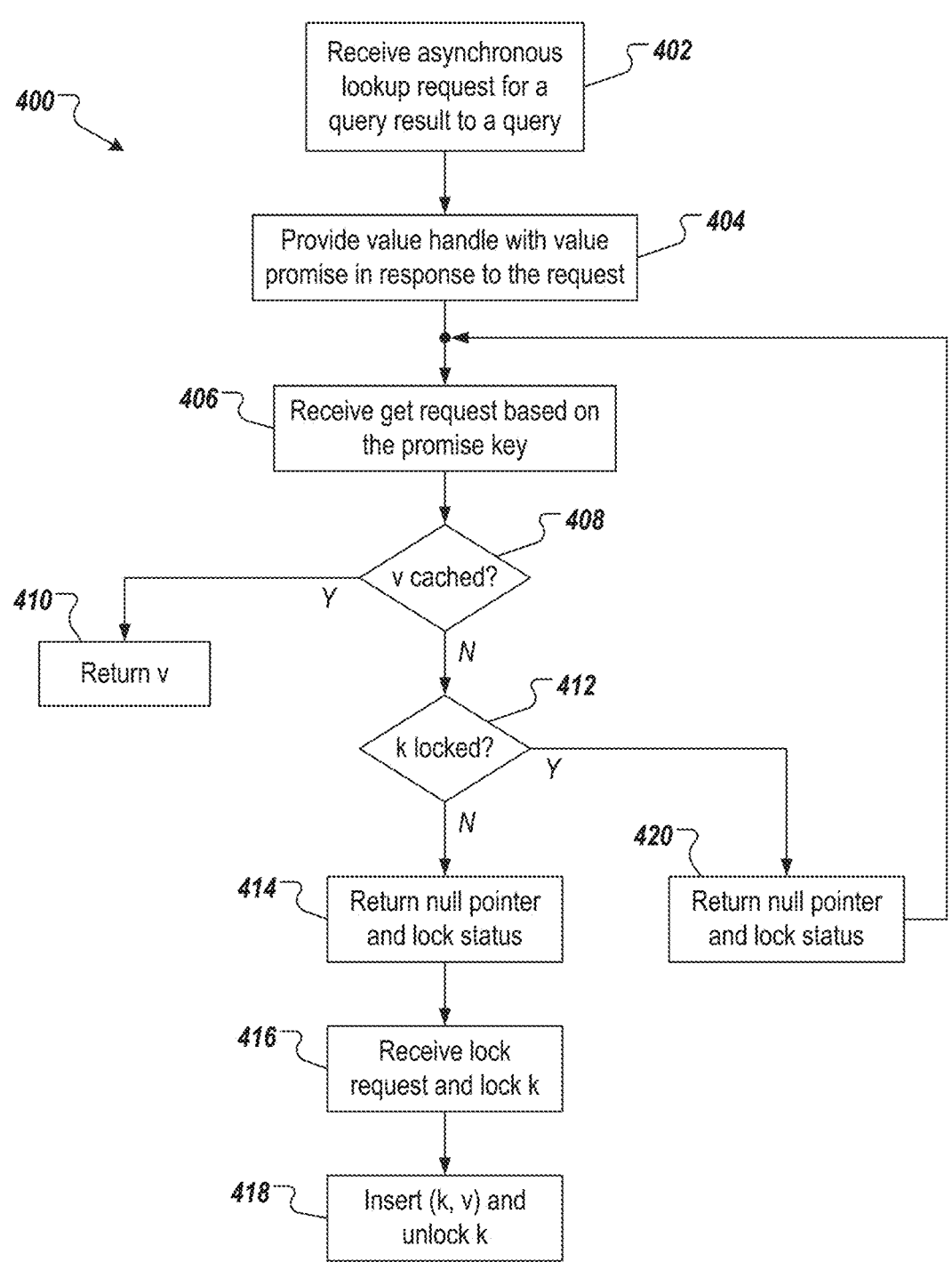
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices.

An asynchronous lookup request is received for a query result of a query (402). For example, and as described in detail herein, the cache instance 306 of FIG. 3 receives an asynchronous lookup request from the database client 302 based on a key (k). As another example, and as described in detail herein, the cache instance 306 receives an asynchronous lookup request from the database client 304 based on a key (k). A value handle with value promise is provided in response to the request (404). For example, and as described in detail herein, the cache instance 306 returns a promise key (vp) to the database client 302. As another example, and as described in detail herein, the cache instance 306 returns a promise key (vp) to the database client 304.

A get request is received based on the value promise (406). For example, and as described in detail herein, the cache instance 306 receives a get request based on the value promise to request the query result (value) by the database client 302 executing a get function (vp.get( )). As another example, and as described in detail herein, the cache instance 306 receives a get request based on the value promise to request the query result (value) by the database client executing a get function (vp.get( )).

It is determined whether a query result (v) is cached (408). For example, and as described in detail herein, the cache instance 306 can determine whether a key, value pair indexed by the key (k) is included in the cache. If the query result is cached, the query result is returned (410). For example, and as described in detail herein, the cache instance 306 returns the value (v) to the database client 304.

If the query result is not cached, it is determined whether the key is locked (412). For example, and as described in detail herein, in response to the respective get requests received from the database client 302, the cache instance 306 determines whether the key (k) is locked. If the key is not locked, a null pointer and lock status are returned (414). For example, and as described in detail herein, the cache instance 306 returns a null pointer (indicating that the query result is not cached) and a lock status (indicating that the key (k) is not locked) to the database client 302. A lock request is received and the key is locked within the cache (416). For example, and as described in detail herein, the database client 302 interacts with the cache instance 306 to lock the key (k) within the cache (e.g., add the key (k) to the cache and put the key (k) in a locked state) and initiates query execution and query result computation.

A query result (v) is received and the key, value pair is inserted into the cache, unlocking the key (418). For example, and as described in detail herein, query execution and query result computation are complete, and the database client 302 has the query result. The database client 302 executes an insert function (insert(k, value)) to insert the key(k) and value (v) pair into the cache within the cache instance 306. Here, the value is the query result. In response, the cache instance 306 confirms storage of the key and value pair in the cache and releases the lock on the key.

If the key is locked (at 412), a null pointer and lock status are returned (420) and the example process 400 loops back. For example, and as described in detail herein, in response to the get function executed by the database client 304, the cache instance 306 returns a null pointer (indicating that the query result is not cached) and a lock status (indicating that the key (k) is locked). In response, the database client 304 starts a waiting period before again executing the get function.

Figure 5:
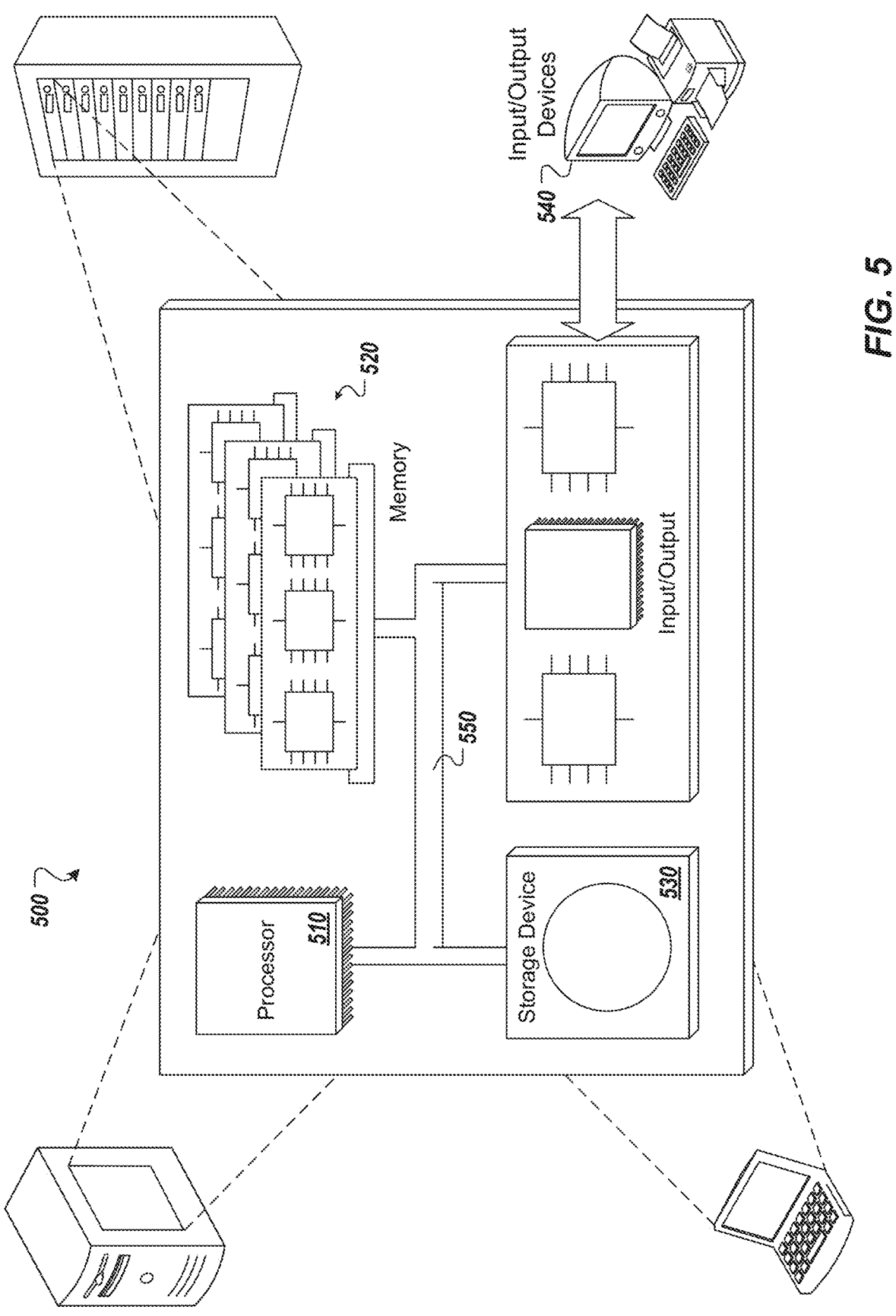
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for handling requests for query results within a results cache for a database system, the method being executed by one or more processors and comprising:

receiving, by a cache instance of a plurality of cache instances and from a first database client, a first asynchronous lookup request comprising a key representative of a query, the first asynchronous lookup request being received prior to the first database client executing the query to generate a query result in a database system, the key comprising a hash value determined based on the query;

in response to receiving the first asynchronous lookup request, returning, to the first database client, a value handle comprising a value promise and a function executable by the first database client to toll a time period for the first database client to re-request the query result;

receiving, by the cache instance and from the first database client, a first get request based on the value promise, the first get request requesting return of the query result from a results cache;

determining that the query result corresponding to the value promise is unavailable in a results cache and that the key is in an unlocked state, and in response:

returning a null pointer and a first key lock status to the first database client, the first database client executing the query in a database system in response to receiving the null pointer and the first key lock status, the query being executed to generate the query result;

receiving, from the first database client, a key, value pair comprising the key and a value, the value comprising the query result; and storing the key, value pair in the results cache.

2. The method of claim 1, further comprising transitioning a state of the key from the unlocked state to a locked state before receiving, from the first database client, a key, value pair.

3. The method of claim 1, wherein the first database client initiates query execution and query result computation in response to the null pointer and a key lock status.

4. The method of claim 1, further comprising:

receiving, from a second database client and prior to storing the key, value pair in the results cache, a second asynchronous lookup request comprising the key representative of the query and, in response, returning the value handle comprising the value promise;

receiving, from the second database client, a second get request based on the value promise; and determining that the query result corresponding to the key is unavailable in a results cache and that the key is in a locked state, and in response, returning the null pointer and a second key lock status to the second database client.

5. The method of claim 4, further comprising:

receiving, from the second database client and after to storing the key, value pair in the results cache, a third get request based on the value promise; and determining that the query result corresponding to the key is available in a results cache, and in response, returning the query result to the second database client.

6. The method of claim 1, wherein the key is generated by processing the query through a hash function.

7. The method of claim 1, wherein the value handle comprises a wrapper that holds data and the function executable by the first database client.

8. A non-transitory computer-readable storage medium coupled to one or more processors and having instructions stored thereon which, when executed by the one or more processors, cause the one or more processors to perform operations for handling requests for query results within a results cache for a database system, the operations comprising:

receiving, by a cache instance of a plurality of cache instances and from a first database client, a first asynchronous lookup request comprising a key representative of a query, the first asynchronous lookup request being received prior to the first database client executing the query to generate a query result in a database system, the key comprising a hash value determined based on the query;

in response to receiving the first asynchronous lookup request, returning, to the first database client, a value handle comprising a value promise and a function executable by the first database client to toll a time period for the first database client to re-request the query result;

receiving, by the cache instance and from the first database client, a first get request based on the value promise, the first get request requesting return of the query result from a results cache;

determining that the query result corresponding to the value promise is unavailable in a results cache and that the key is in an unlocked state, and in response:

returning a null pointer and a first key lock status to the first database client, the first database client executing the query in a database system in response to receiving the null pointer and the first key lock status, the query being executed to generate the query result;

receiving, from the first database client, a key, value pair comprising the key and a value, the value comprising the query result; and storing the key, value pair in the results cache.

9. The non-transitory computer-readable storage medium of claim 8, wherein operations further comprise transitioning a state of the key from the unlocked state to a locked state before receiving, from the first database client, a key, value pair.

10. The non-transitory computer-readable storage medium of claim 8, wherein the first database client initiates query execution and query result computation in response to the null pointer and a key lock status.

11. The non-transitory computer-readable storage medium of claim 8, wherein operations further comprise:

receiving, from a second database client and prior to storing the key, value pair in the results cache, a second asynchronous lookup request comprising the key representative of the query and, in response, returning the value handle comprising the value promise;

receiving, from the second database client, a second get request based on the value promise; and determining that the query result corresponding to the key is unavailable in a results cache and that the key is in a locked state, and in response, returning the null pointer and a second key lock status to the second database client.

12. The non-transitory computer-readable storage medium of claim 11, wherein operations further comprise:

receiving, from the second database client and after to storing the key, value pair in the results cache, a third get request based on the value promise; and determining that the query result corresponding to the key is available in a results cache, and in response, returning the query result to the second database client.

13. The non-transitory computer-readable storage medium of claim 8, wherein the key is generated by processing the query through a hash function.

14. The non-transitory computer-readable storage medium of claim 8, wherein the value handle comprises a wrapper that holds data and the function executable by the first database client.

15. A system, comprising:

a computing device; and a computer-readable storage device coupled to the computing device and having instructions stored thereon which, when executed by the computing device, cause the computing device to perform operations for handling requests for query results within a results cache for a database system, the operations comprising:

receiving, by a cache instance of a plurality of cache instances and from a first database client, a first asynchronous lookup request comprising a key representative of a query, the first asynchronous lookup request being received prior to the first database client executing the query to generate a query result in a database system, the key comprising a hash value determined based on the query;

in response to receiving the first asynchronous lookup request, returning a value handle comprising a value promise and a function executable by the first database client to toll a time period for the first database client to re-request the query result;

receiving, by the cache instance and from the first database client, a first get request based on the value promise, the first get request requesting return of the query result from a results cache;

determining that the query result corresponding to the value promise is unavailable in a results cache and that the key is in an unlocked state, and in response:

returning a null pointer and a first key lock status to the first database client, the first database client executing the query in a database system in response to receiving the null pointer and the first key lock status, the query being executed to generate the query result;

receiving, from the first database client, a key, value pair comprising the key and a value, the value comprising the query result; and storing the key, value pair in the results cache.

16. The system of claim 15, wherein operations further comprise transitioning a state of the key from the unlocked state to a locked state before receiving, from the first database client, a key, value pair.

17. The system of claim 15, wherein the first database client initiates query execution and query result computation in response to the null pointer and a key lock status.

18. The system of claim 15, wherein operations further comprise:

receiving, from a second database client and prior to storing the key, value pair in the results cache, a second asynchronous lookup request comprising the key representative of the query and, in response, returning the value handle comprising the value promise;

receiving, from the second database client, a second get request based on the value promise; and determining that the query result corresponding to the key is unavailable in a results cache and that the key is in a locked state, and in response, returning the null pointer and a second key lock status to the second database client.

19. The system of claim 18, wherein operations further comprise:

receiving, from the second database client and after to storing the key, value pair in the results cache, a third get request based on the value promise; and determining that the query result corresponding to the key is available in a results cache, and in response, returning the query result to the second database client.

20. The system of claim 15, wherein the key is generated by processing the query through a hash function.

* * * * *